United States Patent [19]
Isobe et al.

[11] Patent Number: 4,942,099
[45] Date of Patent: Jul. 17, 1990

[54] FUEL CELL

[75] Inventors: Kenji Isobe, Kawasaki; Michio Hori, Yokohama; Hiroyasu Yoshizawa, Oomiya; Kazuo Ogawa; Hiroyuki Takahashi, both of Yokohama; Mitsuo Noguchi, Zama; Toshio Maeda, Yokohama, all of Japan

[73] Assignee: Kabushiki Kaisha Toshiba, Kawasaki, Japan

[21] Appl. No.: 442,785

[22] Filed: Nov. 28, 1989

[30] Foreign Application Priority Data

| Nov. 28, 1988 | [JP] | Japan | 63-298070 |
| Apr. 14, 1989 | [JP] | Japan | 1-93126 |
| Jul. 31, 1989 | [JP] | Japan | 1-19824 |

[51] Int. Cl.$^5$ .............................................. H01M 2/08
[52] U.S. Cl. .............................................. 429/35; 429/39
[58] Field of Search ...................... 429/34–39, 429/185

[56] References Cited

U.S. PATENT DOCUMENTS

| 4,510,213 | 4/1985 | Schnacke | 429/36 |
| 4,732,822 | 3/1988 | Wright et al. | 429/34 |
| 4,743,519 | 5/1988 | Kaji et al. | 429/35 X |
| 4,758,481 | 7/1988 | Fauvel | 429/39 |

FOREIGN PATENT DOCUMENTS 63-226885  9/1988  Japan .

Primary Examiner—Anthony Skapars
Attorney, Agent, or Firm—Oblon, Spivak, McClelland, Maier & Neustadt

[57] ABSTRACT

Unit cells and separator elements are stacked in layers, thus constituting a stacked structure of a fuel cell. A first segment channel, which is bored through the peripheral region of each separator element, communicates with a second segment channel formed in a cylindrical seal member which is joined to each two adjacent separator elements. Thus, manifolds for the intake and exhaust of a fuel gas and an oxidant gas are defined. The cylindrical seal member includes a pair of ring-shaped metal members joined to each two adjacent separator elements and a ring-shaped insulating member interposed between the metal members. Thus, the gases in the manifolds can be prevented from leaking out, and the adjacent separator elements are insulated from one another.

45 Claims, 11 Drawing Sheets

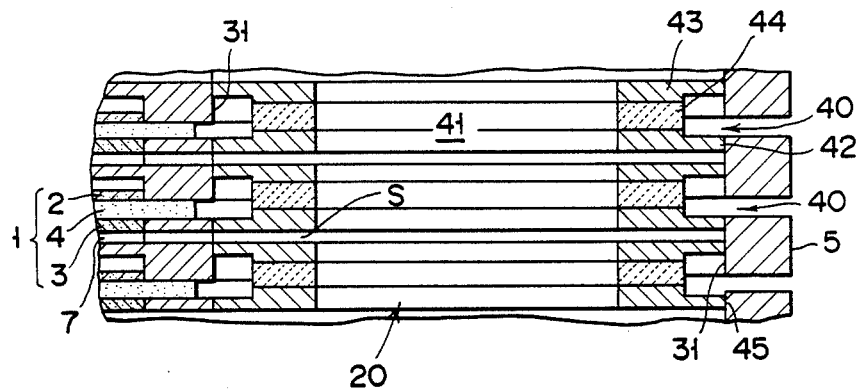
F I G. 4
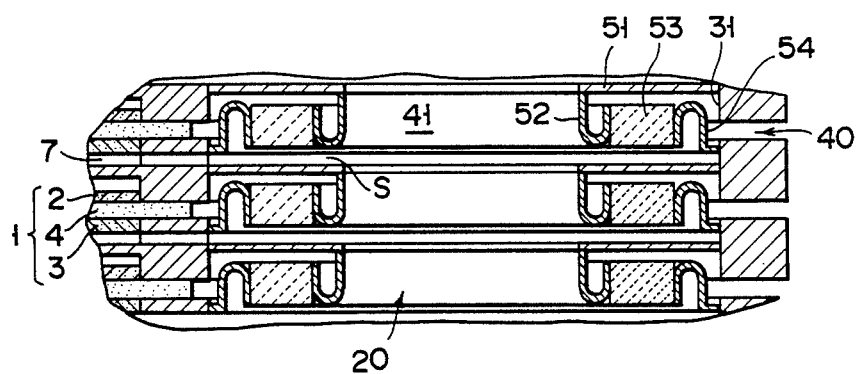
F I G. 5

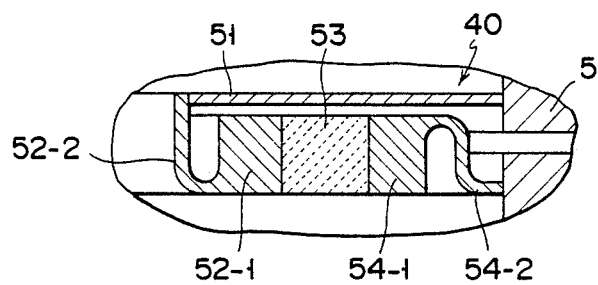
F I G. 8
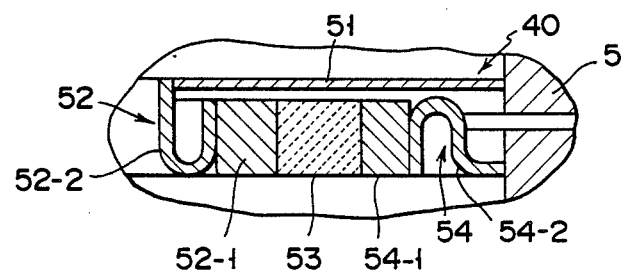
F I G. 9
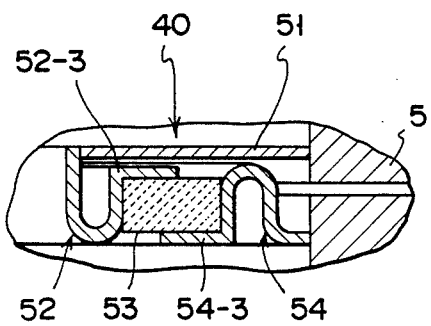
F I G. 10

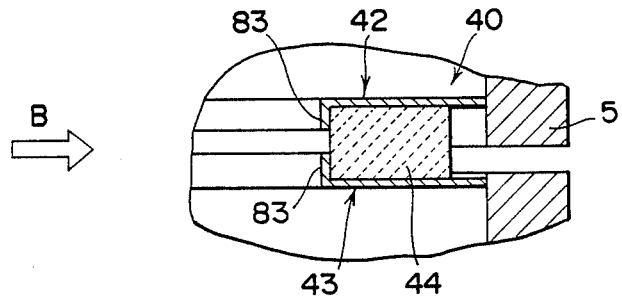
F I G. 16
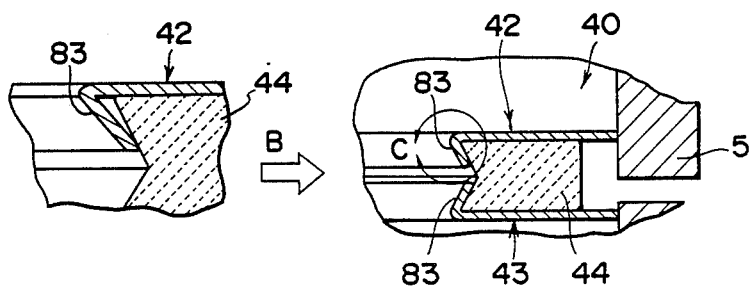
F I G. 17B   F I G. 17A
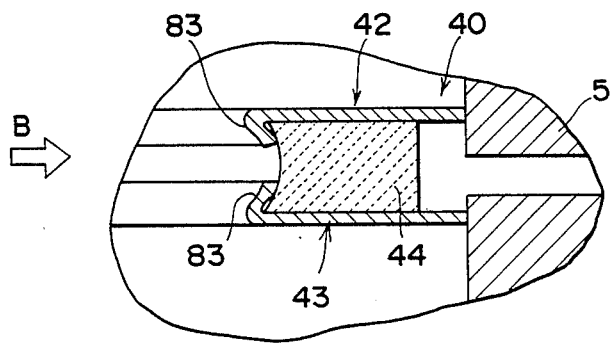
F I G. 18 ary, each seal mem-

FUEL CELL

BACKGROUND OF THE INVENTION

1. Field of the Invention

The present invention relates to a fuel cell, and more particularly, to a fuel cell having means for sealing a manifold for the intake and exhaust of a fuel gas and an oxidant gas.

2. Description of the Related Art

A fuel cell, e.g., a molten carbonate fuel cell, comprises unit cells which are each formed of a porous anode, a porous cathode, and an electrolyte tile interposed between them. When a fuel gas and an oxidant gas are supplied to the anode and the cathode, respectively, in each unit cell, an electrode reaction is caused, so that electric energy is produced. Voltage produced by each unit cell is as low as 1 V. Therefore, a number of unit cells are stacked in layers, and a number of conductive separator elements are interposed between the unit cells to connect them electrically, thus constituting a stacked structure. Thus, the fuel cell can produce high voltage.

The two gasses must be prevented from leaking out of the stacked structure and from mixing with each other, and the adjacent separator elements must be electrically insulated from one another. Therefore, the peripheral regions of separator elements and those of the electrolyte tiles are stacked in contact with each other, and then are sealed by a wet-seal system. More specifically, the temperature of the stacked structure is raised to 650° C. or the working temperature of the fuel cell. When the temperature of the material of the electrolyte tiles attains 488° C., in the course of the temperature rise, the electrolyte material melts. The molten substance fills up the gaps between the contact surfaces of the separator elements and the electrolyte tiles. Thus, the stacked structure is sealed and the adjacent separators are insulated from one another.

Formed inside the stacked structure are fuel gas manifolds for the intake and exhaust of the fuel cell into and from the anodes of the individual unit cells, and oxidant gas manifolds for the intake and exhaust of the oxidant gas into and from the cathodes of the unit cells. In each manifold, through holes or segment channels bored through the peripheral regions of the separator elements communicate individually with through holes or segment channels bored through the peripheral regions of the electrolyte tiles. Since the peripheral regions of the separators and those of the electrolyte tiles are sealed by the wet-seal system, the gases are prevented from leaking out through the boundaries between the through holes of the separator elements and the electrolyte tiles, that is, the manifolds are sealed.

However, there is a possibility of the performance of the aforementioned seal being unsatisfactory, due to the wettability of the electrolyte tiles, variation of the thickness accuracy of the separator elements and the elements constituting the unit cells, variation of applied pressure, variation of the accuracy of the contact surfaces of the separator elements and the electrolyte tiles, etc. In consequence, the fuel gas and the oxidant gas may possibly leak out and be mixed with each other, so that they cannot be effectively used.

SUMMARY OF THE INVENTION

The object of the present invention is to provide a fuel cell in which the sealing performance of individual manifolds can be secured with electrically insulating between adjacent separator elements, so that a fuel gas and an oxidant gas can be prevented from leaking out of the manifolds or from mixing with each other.

According to the present invention, there is provided a fuel cell which comprises: a plurality of unit cells stacked in layers, each adapted to receive two kinds of gases to generate electrical power; a plurality of separator elements, each formed of a conductive material and having a peripheral region and a first segment channel penetrating the peripheral region thereof, the separator elements being interposed and electrically connected between the adjacent unit cells to form a stacked structure in which the first segment channels are aligned in the stacking direction; and a plurality of seal members, the seal members each including (a) two annular conductive members, (b) an electrically insulating annular member interposed between the two conductive members, and (c) a second segment channel penetrating the two conductive members and the insulating member, the two annular conductive members being joined to the adjacent separator elements so as to communicate the second segment channel with the adjacent first segment channels to define a manifold for the intake and exhaust of the gas into and from the unit cells, thereby preventing the gas in the manifold from leaking out, and insulating the adjacent separator elements.

In the present invention, the manifold is sealed by means of the seal members. In contrast with the conventional case, in order to seal the manifold, the wet-seal system need not be used. Thus, even if the respective contact surfaces of the separator elements are subject to variation in working accuracy, satisfactory sealing performance can be ensured, so that the gas in each manifold can be prevented from leaking out.

Even though the manifolds for the fuel gas and the oxidant gas are located relatively close to each other, therefore, there is no possibility of the two gases mixing with each other, so that the safety of the fuel cell is improved. Since gas leakage is reduced, moreover, the gases can be used effectively. Naturally, each seal member includes the insulating member, the adjacent separator elements are electrically insulated from one another.

Also, the surface accuracy of the separator elements and the like may be lowered, so that the machining work is easy, and the yield of products is improved, thus permitting reduction in costs.

Since an electrolyte tile may be made smaller than each separator element, and the amount of electrolyte tile incorporated in each unit cell is reduced, the yield is further improved to ensure additional reduction in costs.

BRIEF DESCRIPTION OF THE DRAWINGS

FIG. 4 is an enlarged sectional view of a region enclosed by circle A of FIG. 3;

FIG. 5 is a sectional view of a principal part of a fuel cell according to a first modification of the invention;

FIGS. 6A and 6B are sectional views showing a principal part of a fuel cell according to a second modification of the invention, in which FIG. 6A shows a state of the fuel cell without seal members, and FIG. 6B shows a state in which the seal members are attached to the fuel cell;

FIGS. 8 to 16 are sectional views of seal members attached to fuel cells according to fourth to twelfth modifications of the invention, respectively;

FIG. 17A is a sectional view of a seal member attached to a fuel cell according to a thirteenth modification of the invention;

FIG. 17B is a partial enlarged sectional view of a region enclosed by circle C of FIG. 17A;

FIG. 18 is a sectional view of a seal member attached to a fuel cell according to a fourteenth modification of the invention;

DETAILED DESCRIPTION OF THE PREFERRED EMBODIMENTS

Figure 1:
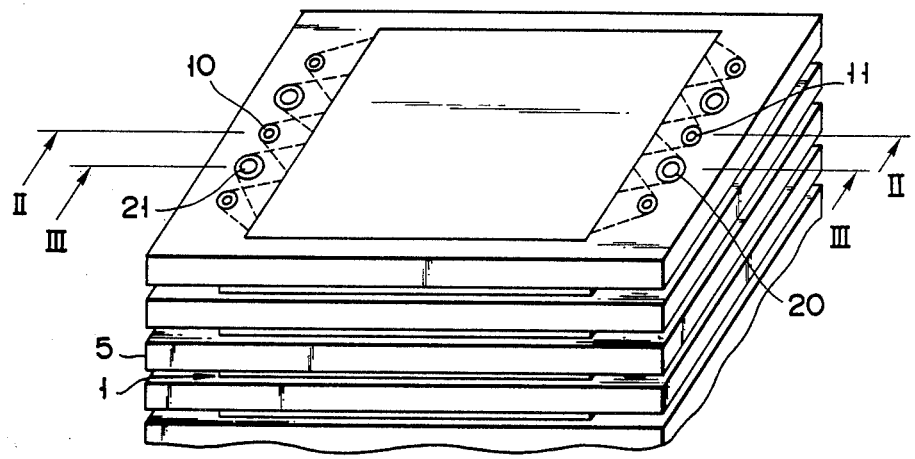
FIG. 1 is a perspective view of a fuel cell according to an embodiment of the present invention.

FIGS. 1 to 4 show a molten carbonate fuel cell according to an embodiment of the present invention. The fuel cell comprises a plurality of unit cells 1 which are each formed of porous anode 2, porous cathode 3, and electrolyte tile 4 interposed between elements 2 and 3. Unit cells 1 are stacked in layers, and a plurality of conductive separator elements 5 are interposed between the cells, thus forming a stacked structure.

Each separator element 5 electrically connects two adjacent unit cells 1. Element 5 is formed with a number of fuel gas passages 6 (see FIG. 2) for supplying a fuel gas to anode 2 and dispersing it, and a number of oxidant gas passages 7 (see FIG. 3) for supplying an oxidant gas to cathode 3 and dispersing it. Passages 6 and 7 extend parallel to each other.

Figure 2:
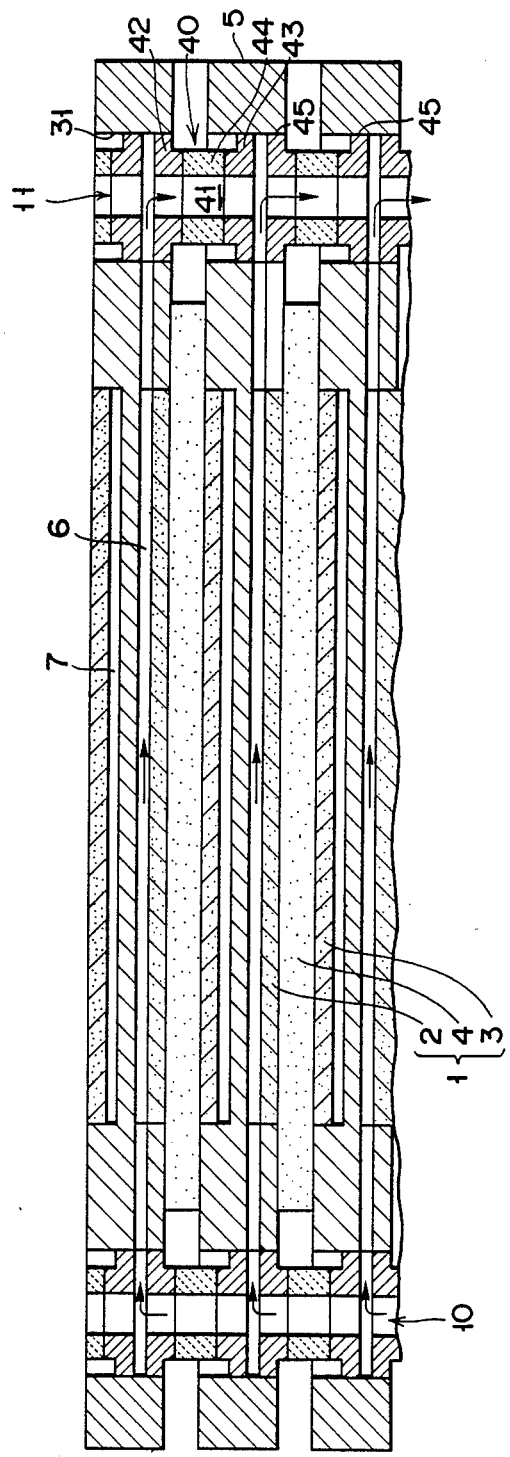
FIG. 2 is a sectional view taken along line II—II of FIG. 1.

As shown in FIGS. 1 and 2, the cell has fuel gas intake manifold 10 for introducing the fuel gas from the outside into passages 6 and fuel gas exhaust manifold 11 for exhausting the fuel gas from passages 6 to the outside.

Figure 3:
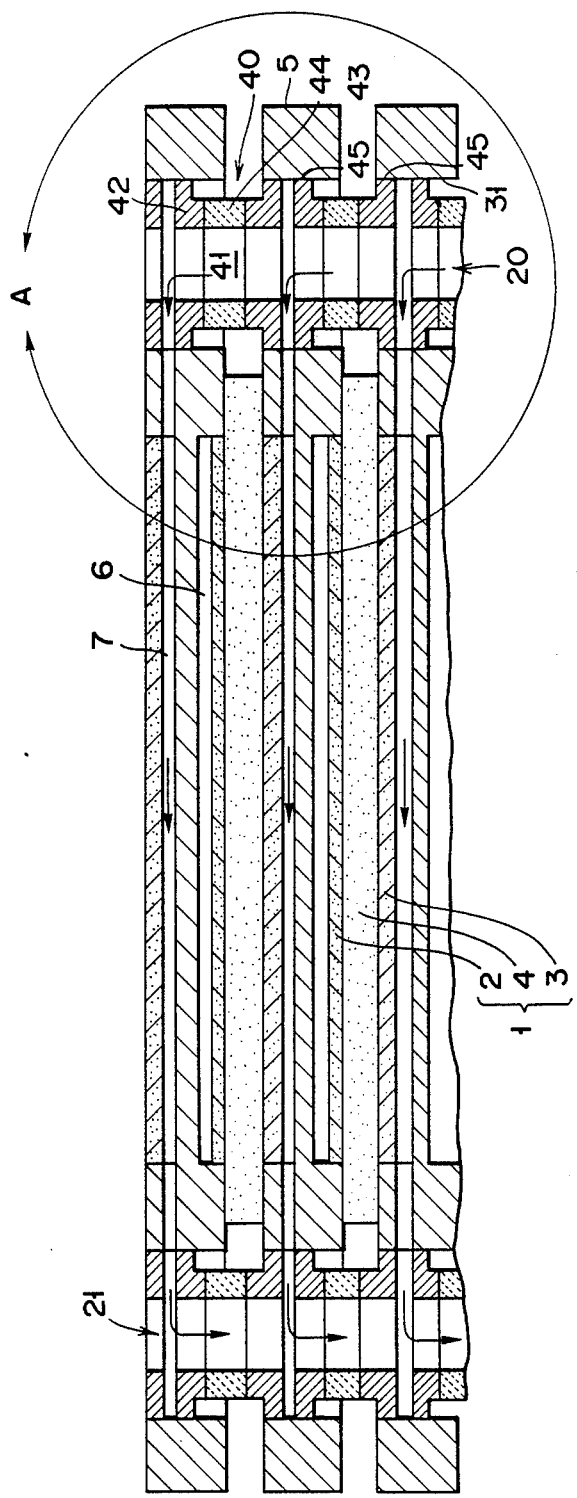
FIG. 3 is a sectional view taken along line III—III of FIG. 1.

Likewise, as shown in FIGS. 1 and 3, the cell has oxidant gas intake manifold 20 for introducing the oxidant gas from the outside into passage 7 and oxidant gas exhaust manifold 21 for exhausting the oxidant gas from passages 7 to the outside.

Thus, when the fuel gas is supplied through fuel gas intake manifold 10 to passages 6 to permeate anode 2, and when the oxidant gas is supplied, at the same time, through oxidant gas intake manifold 20 to permeate cathode 3, an electrode reaction is caused. As a result, electric energy is produced. After the reaction, the fuel gas is discharged to the outside through passages 6 and exhaust manifold 11. At the same time, the oxidant gas after the reaction is also discharged to the outside through passages 7 and exhaust manifold 21.

All four manifolds 10, 11, 20 and 21 are constructed in the same manner as follows.

As shown in FIGS. 2 and 3, each manifold is composed of a number of first segment channels 31, penetrating peripheral regions of separator elements 5 and aligned in the stacking direction, and a number of second segment channels 41 defined inside a number of cylindrical seal members 40 (described in detail later) and communicating with channels 31.

Referring now to FIG. 4, cylindrical seal members 40 for sealing the inside of the manifolds will be described. FIG. 4 shows a principal part of oxidant gas intake manifold 20 shown in FIG. 3.

Each seal member 40 is formed of two ring-shaped metal members 42 and 43 and ring-shaped insulating member 44 interposed between them. Members 42, 43 and 44 constitute second segment channel 41. Each of metal members 42 and 43 has ring-shaped outer peripheral end face 45, which is joined to the inner wall of first segment channel 31 of its corresponding separator element 5 by brazing or welding. Insulating member 44 is formed of alumina, zirconia, or some other ceramic material which has high electrical insulating capability. Member 44 is joined to the two metal members by brazing or ceramic bonding.

Each two adjacent seal members 40 are spaced from each other, and gap S between them communicates with oxidant gas intake manifold 20 and oxidant gas passages 7.

In this embodiment, as described above, outer peripheral end faces 45 of metal members 42 and 43 of cylindrical seal member 40 are joined to segment channels 31 of separator elements 5. In contrast with the conventional case, in order to seal the manifold, the wet-seal system need not be used. Thus, even if the respective contact surfaces of the separator elements are subject to variation in working accuracy, satisfactory sealing performance can be ensured, so that the gas in each manifold can be securely prevented from leaking out.

Even though the manifolds for the fuel gas and the oxidant gas are located relatively close to each other, therefore, there is no possibility of the two gases mixing with each other, so that the safety of the fuel cell is improved. Since gas leakage is reduced, moreover, the gases can be used effectively.

Since insulating member 44 serves to insulate the two metal members, furthermore, adjacent separator elements 5 are electrically insulated from one another. Insulating member 44, which is formed of ceramics, can be made fairly thin without rendering the insulation between separator elements 5 unsatisfactory.

Also, the surface accuracy of separator elements 5 and the like may be lowered, so that the machining work is easy, and the yield of products is improved, thus permitting reduction in costs. Since electrolyte tile 4 may be made smaller than separator element 5, moreover, the yield is further improved to ensure additional reduction in costs.

The fuel cell is operated at a relatively high temperature. It is necessary, therefore, to consider the degree of thermal expansion of each member when the fuel cell is at high temperature.

Accordingly, metal members 42 and 43, insulating member 44, and separator element 5 may be formed having coefficients of expansion closely resembling one another. In this case, no distortion can be caused by differences in thermal expansion at the junctions between the metal members and the segment channels of the separator element and between the metal members and the insulating member. Thus, the durability can be improved, and the sealing performance can be further improved.

Outer peripheral end faces 45 of metal members 42 and 43 may be fitted in recesses (not shown) in the inner peripheral surfaces of segment channels 31 of the separator element, instead of being joined to the inner peripheral surfaces. In case that metal members 42 and 43 may be made of a material whose coefficient of linear expansion is greater than that of separator element 5, when end faces 45 of members 42 and 43 are fitted in the recesses of channels 31, the gaps between the recesses and end faces 45 are filled up by the difference in thermal expansion, so that the sealing performance can be further improved.

FIG. 5 shows a first modification of the present invention. In this modification, each seal member 40 is provided with ring-shaped metal plate 51 whose outer peripheral end is joined to segment channel 31 of separator element 5. The inner peripheral end portion of ring-shaped metal member 52 with a U-shaped cross section is joined to the inner peripheral end portion of plate 51 by welding or the like. The inner peripheral end face of ring-shaped insulating member 53 is joined to the outer peripheral end portion of metal member 52 by ceramic bonding or the like. The inner peripheral end portion of ring-shaped metal member 54 with an inverted-U-shaped cross section is joined to the outer peripheral end face of insulating member 53, and the outer peripheral end face of member 54 is joined to the inner peripheral surface of segment channel 31 of separator element 5 adjacent thereto.

The seal member according to this modification has the same sealing performance as the seal members according to the embodiment shown in FIGS. 1 to 4. Since two ring-shaped metal members 52 and 54 each have a U-shaped cross section, they can yield with respect to the plane direction (along the electrolyte tile of each unit cell and each separator element). In other words, members 52 and 54 is flexible with respect to the plane direction. When the fuel cell is heated to the working temperature, thermal expansion difference between separator 5 and insulating member 53 can be absorbed by the yield of metal members 52 and 54. Accordingly, excessive tensile strain can be restrained from being applied to the insulating member, e.g. ceramic material which has fragile characteristic with respect to the tension, and also excessive force can be restrained from being applied to the junctions between metal members 52 and 54 and insulating member 53. Thus, the sealing performance and durability can be further improved.

Even if the metal members and the separator element are subject to errors in workmanship, furthermore, the errors can be absorbed by the flexure of the two metal members. Thus, the welding work is relatively easy.

Ring-shaped plate 51 can yield in the stacking direction, that is, it is flexible with respect to the stacking direction. Thus, a force applied in the stacking direction of the fuel cell can be absorbed by the flexibility of plate 51. Even if the thickness of the electrolyte tile varies, moreover, the variation can be absorbed.

Figure 6A:
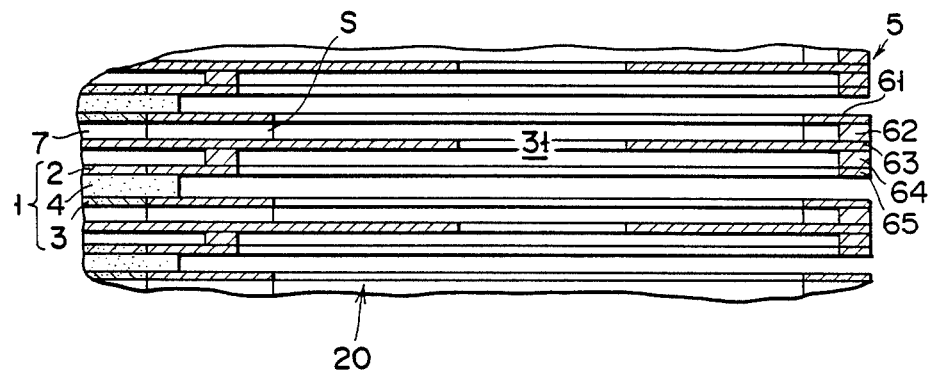
Figure 6B:
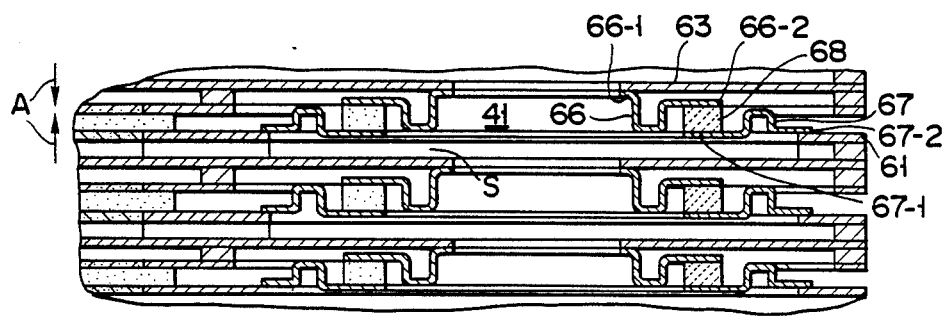

FIGS. 6A and 6B show a second modification of the present invention. A first difference between this modification and the foregoing embodiment lies in the construction of the separator element. FIGS. 6A is a sectional view of a fuel cell without any seal member. Separator element 5 has metal plate 61 at the top portion thereof. Metal member 62 is joined to the underside of plate 61, and metal plate 63 is joined to the bottom of member 62. Also, separator element 5 has member 64 and plate 65 arranged in like manner. Plates or members 61 to 65 are penetrated by a hole, which defines first segment channel 31 for the aforementioned manifold. Further, gap S for connecting each oxidant gas passage 7 and channel 31 is formed between plates 61 and 63.

As shown in FIG. 6B, Seal member 40 includes two ring-shaped metal members 66 and 67 and insulating member 68. Inner peripheral end portion 66-1 of member 66 is welded to the lower surface of plate 63. Metal member 66 has a substantially U-shaped cross section, and its outer peripheral end portion 66-2 S is joined to the upper surface of insulating member 68 by ceramic bonding. Member 66 defines second segment channel 41 for the manifold. Metal member 67 also has a substantially U-shaped cross section, and its inner peripheral end portion 67-1 is joined to the lower surface of insulating member 68 by ceramic bonding. Outer peripheral end portion 67-2 of member 67 is welded to the upper surface of plate 61 of separator element 5.

In this arrangement, the inside of each manifold is sealed, and the separator elements adjacent thereto are insulated from one another.

As shown in FIG. 6B, at the working temperature, electrolyte tile 4 of each unit cell is liable to undergo a creep such that it contracts in the stacking direction (showing "A" of FIG. 6B). Metal members 66 and 67 and insulating member 68 are joined with each other at the upper and lower surfaces thereof. Thus, compressive load acts on their junctions so that the reliability of the junctions can be further improved.

Since the two metal members are substantially U-shaped, as in the foregoing modification, they can absorb the shearing force applied in the plane direction. Naturally, the force in the stacking direction is also absorbed by the flexure of plate 63.

Further, one of the metal members is situated radially inside the insulating member, while the other metal member is situated radially outside the insulating member. Thus, the thickness of the fuel cell in the stacking direction can be reduced.

Figure 7:
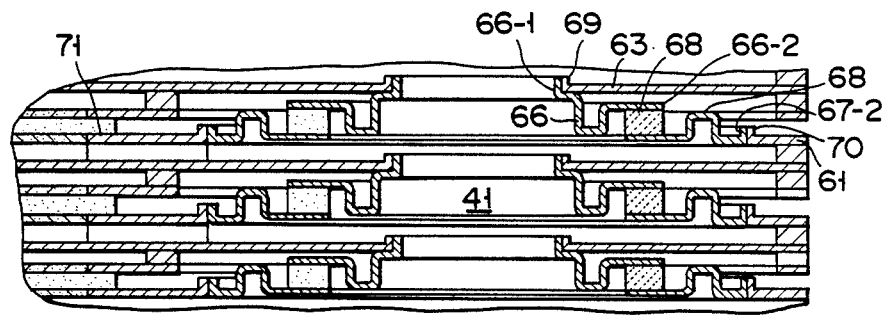
FIG. 7 is a sectional view of a principal part of a fuel cell according to a third modification of the invention.

FIG. 7 shows a third modification of the present invention. This modification differs from the modifications shown in FIGS. 6A and 6B only in the following arrangement. Riser flanges 69 and 70 are formed at the respective end portions of plates 63 and 61, respectively. Inner peripheral end portion 66-1 of metal member 66 is in the form of a riser flange which corresponds to flange 69 in shape, and these two flanges are joined together. Likewise, outer peripheral end portion 67-2 of metal member 67 is in the form of a riser flange which corresponds to flange 70 in shape, and these two flanges are also joined together.

In this arrangement, deformation of the separator elements attributable to welding contraction at working and thermal influence can be reduced. Thus, contact surface 71 (FIG. 7) of separator element 5 in contact with electrolyte tile 4 can be kept flat. It is to be understood that the shapes and positions of the riser flanges are not limited to the modification described above, and may be changed as required.

FIG. 8 shows a fourth modification of the present invention. This modification differs from the one shown in FIG. 5 only in the following arrangement. Metal member 52 has thick wall portion 52-1, formed in contact with insulating member 53, and thin wall portion 52-2. Likewise, metal member 54 has thick wall portion 54-1 and thin wall portion 52-2. Further, metal members 52 and 54 and insulating member 53 are made of materials whose coefficients of expansion are substantially equal. These coefficients of expansion are generally smaller than that of separator element 5.

If these members undergo thermal expansion, thermal deformation is applied between separator 5, and metal members 52 and 54 and insulating member 53. This thermal deformation, however, is absorbed by the flexure of only thin wall portions 52-2 and 54-2 of members 52 and 54. Thus, the influence on the junctions between metal member 52 and 54 and insulating member 53 is reduced by the flexure of the thin wall portions as well as the reinforce effect of thick wall portions 52-1 and 54-1.

FIG. 9 shows a fifth modification of the present invention. This modification differs from the one shown in FIG. 8 only in the following arrangement. In the fifth modification, thick wall portion 52-1 and thin wall portion 52-2 of metal member 52 are formed independently of each other, and are welded together. Likewise, thick wall portion 54-1 and thin wall portion 54-2 of metal member 54 are formed independently of each other. In this modification, thick wall portion 52-1, formed by, for example, cutting a tubular member, may be welded to thin wall portion 52-2 manufactured by sheet metal processing. Thus, the seal member can be manufactured with ease.

FIG. 10 shows a sixth modification of the present invention. This modification differs from the one shown in FIG. 5 only in the following arrangement. In this modification, outer peripheral end portion 52-3 of metal member 52 is bonded to a side face and the upper surface of insulating member 53.

Since insulating member 53 is held on its side faces and upper and lower surfaces, the bonding strength between metal members 52 and 54 and insulating member 53 is great.

Figure 11:
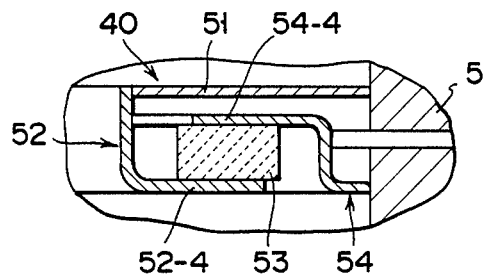

FIG. 11 shows a seventh modification of the present invention. This modification differs from the one shown in FIG. 5 only in the following arrangement. In this modification, metal member 52 has an L-shaped cross section, and its outer peripheral end portion 52-4 is bonded to the lower surface of insulating member 53. Metal member 54 also has an L-shaped cross section, and its inner peripheral end portion 54-4 is bonded to the upper surface of insulating member 53. In this example, the metal members have a simple configuration, so that the seal member can be manufactured with ease.

Figure 12:
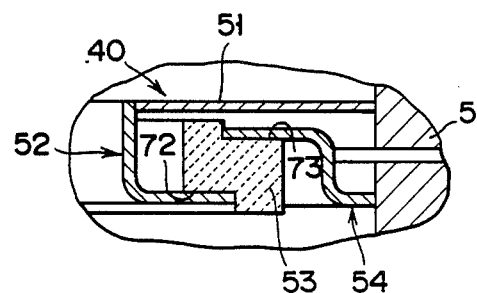

FIG. 12 shows an eighth modification of the present invention. This modification differs from the one shown in FIG. 11 only in the following arrangement. In this modification, metal members 52 and 54 are joined to step portions 72 and 73, respectively, of insulating member 53. In their junctions, the thermal deformation of separator 5 is also restricted by the insulating member, so that the load applied to their junctions can be reduced, as compared with the load applied to the junctions shown in FIG. 11. Further, metal members 52 and 54 and insulating member 53 can be positioned with ease.

Figure 13:
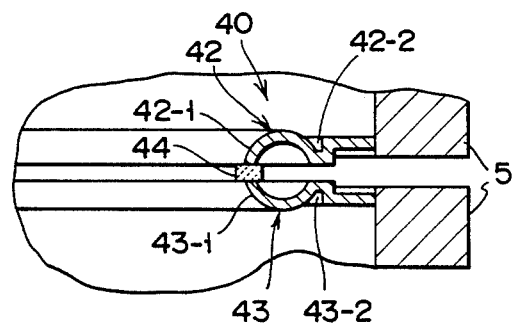

FIG. 13 shows a ninth modification of the present invention. This modification differs from the one shown in FIGS. 2 to 4 only in the following arrangement. In this modification, metal members 42 and 43 are symmetrical with respect to the horizontal direction, and include arcuate portions 42-1 and 43-1, having an arcuate cross section, and waist portions 42-2 and 43-2 coupled thereto, respectively.

If separator element 5 and the like undergo thermal expansion, waist portions 42-2 and 43-2 are constricted so that distortion attributable to the thermal expansion is absorbed thereby. Thus, the seal member of this modification is also flexible with respect to both the stacking direction and the plane direction. Since metal members 42 and 43 are symmetrical with respect to the vertical direction, moreover, the components may be used in common, so that the manufacturing costs can be reduced.

Figure 14:
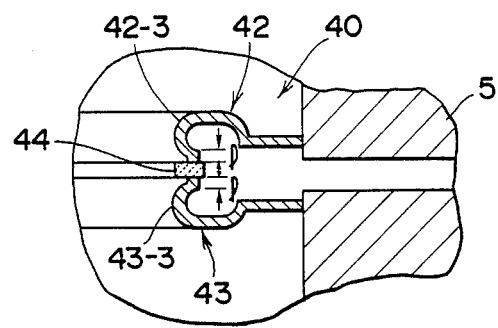

FIG. 14 shows a tenth modification of the present invention. This modification differs from the one shown in FIG. 13 only in the following arrangement. In this modification, metal members 42 and 43 are symmetrical with respect to the horizontal direction, and include elliptical portions 42-3 and 43-3, having an elliptical cross section, and straight portions 1 coupled thereto and extending in a straight line, respectively, and metal members has a flexible structure. Straight portions 1 are vertically bonded to insulating member 44 from above and below.

Also in this modification, the components may be used in common, thus permitting reduction in costs.

Further, thermal stress (strain) attributable to thermal expansion can be absorbed by elliptical portions 42-3 and 43-3. Therefore, the junctions cannot be easily influenced by the thermal stress, so that straight portions 1 cannot be easily disengaged from insulating member 44. Thus, the sealing performance can be further improved.

Figure 15:
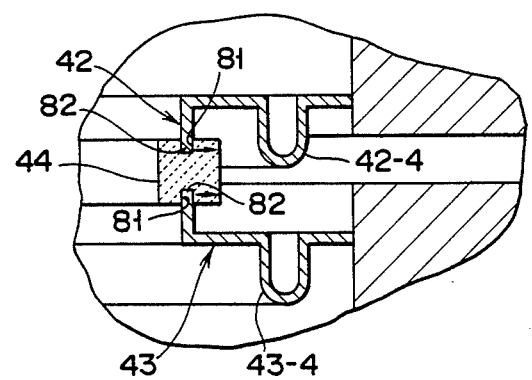

FIG. 15 shows an eleventh modification of the present invention. This modification differs from the one shown in FIGS. 2 to 4 only in the following arrangement. In this modification, metal members 42 and 43 include U-shaped portions 42-4 and 43-4 with a U-shaped cross section, respectively, and insulating member 44 has slits 81 in which end portions 82 of members 42 and 43 are fitted (slit-connected) individually. The coefficient of expansion of metal members 42 and 43 is a little greater than that of insulating member 44.

Accordingly, the metal members are thermally expanded to a higher degree than the insulating member. Therefore, end portions 82 of the metal members mainly expand outward with respect to the radial direction of the ring-shaped metal members (or in the direction of the arrows of FIG. 15), so that the gaps between end portions 82 and slits 81 are filled up. Thus, the metal members and the insulating member are firmly bonded together, so that the sealing performance can be further improved.

FIG. 16 shows a twelfth modification of the present invention. This modification differs from the one shown in FIGS. 2 to 4 only in the following arrangement. In this modification, metal members 42 and 43 each include ring wall 83 extending along the inner peripheral surface of insulating member 44. Paired ring walls 83 are contact to the inner peripheral surface of member 44 by crimping or press fitting.

If the metal members undergo thermal expansion, therefore, ring walls 83 expand outward with respect to the radial direction of the ring-shaped metal members (or to the right of FIG. 16), since the coefficient of linear expansion of the metal members is different from that of the insulating member. As a result, ring walls 83 continually apply pressure to the inner peripheral surface of insulating member 44, so that the sealing performance can be further improved. Since the insulating member and the metal members need not be joined by ceramic bonding, moreover, the seal member can be manufactured with ease.

If separator element 5 is constructed in the manner shown in FIG. 6A, furthermore, the two metal members may be replaced by plates 61 and 63. In this case, the seal member can more easily be manufactured.

FIGS. 17A and 17B show a thirteenth modification of the present invention. This modification differs from the one shown in FIG. 16 only in the following arrangement. In this modification, the inner peripheral surface of insulating member 44 has a V-shaped cross section. Ring walls 83 of two metal members 42 and 43 are contact to the V-shaped inner peripheral surface by crimping or press fitting. The coefficient of expansion of metal members 42 and 43 is greater than that of insulating member 44.

If ring walls 83 are crimped, a gap is formed between each wall 83 and the V-shaped inner peripheral surface of insulating member 44, as shown in FIG. 17B. If the metal members undergo thermal expansion, ring walls 83 which have relatively great coefficient of linear expansion slide along the V-shaped inner peripheral surface. Thus, metal members 42 and 44 which are integrated with ring walls 83 apply pressure to insulating member 44 at the upper and lower surfaces thereof. Thus, the sealing performance can be further improved. Herein, the gaps allow frictional resistance to decrease, so that the slide can be performed with ease.

FIG. 18 shows a fourteenth modification of the present invention. This modification differs from the one shown in FIG. 16 only in the following arrangement. In this modification, the inner peripheral surface of insulating member 44 has an arcuate cross section. Ring walls 83 are contact to the arcuate inner peripheral surface by crimping or press fitting Also in this modification, if the metal members undergo thermal expansion, ring walls 83 which have relatively great coefficient of expansion slide along the arcuate inner peripheral surface. Thus, metal members 42 and 43 which are integrated with ring walls 83 apply pressure to insulating member 44 at the upper and lower surfaces thereof Thus, the sealing performance can be further improved. Herein, the gaps allow frictional resistance to decrease so that the slide can be performed with ease.

Figure 19:
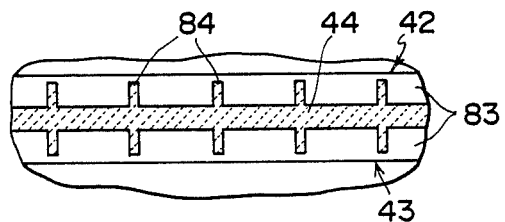
FIGS. 19 and 20 are schematic views of seal walls taken in the direction of arrow B of FIG. 16, 17A or 18.

FIG. 19, which is a schematic view of a seal member taken in the direction of arrow B of FIGS. 16 to 18, shows a fifteenth modification of the present invention. In this modification, ring walls 83 have a number of slits 84 each. When walls 83 are crimped, therefore, they can be bent with a relatively small force. Thus, the crimping work is easy, so that the seal member can more easily be manufactured.

Figure 20:
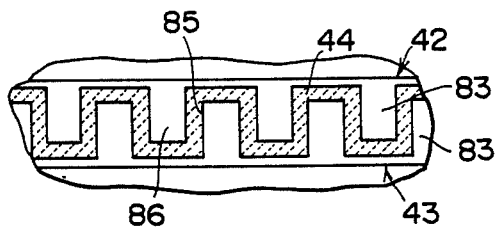

FIG. 20, which is a schematic view of a seal member taken in the direction of arrow B of FIGS. 16 to 18, shows a sixteenth modification of the present invention. In this modification, metal pieces 86 of one of ring walls 83 are situated corresponding individually to notches 85 formed in the other ring wall. Therefore, even if insulating member 44 is made thin, the adjacent ring walls 83 are not contact with each other so that the electrical insulation can be satisfactorily secured, and also the crimping strength can be satisfactorily secured.

Figure 21:
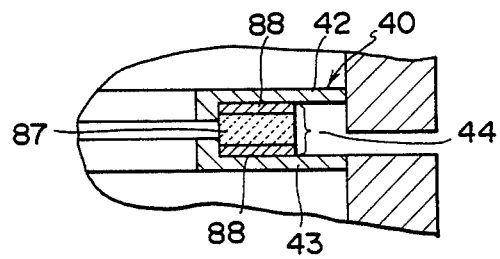
FIGS. 21 to 25 are sectional views of seal members attached to fuel cells according to seventeenth to twenty-first modification of the invention, respectively.

FIG. 21 shows a seventeenth modification of the present invention. This modification differs from the one shown in FIG. 16 only in the following arrangement. In this modification, ring-shaped insulating member 44 is formed of ring-shaped ceramic member 87 and a pair of ring-shaped wet members 88 arranged on either side of member 87. As in the foregoing modifications, metal members 42 and 43 are bonded to insulating member 44 by crimping.

Wet members 88 are formed of, for example, an electrolyte. When they are heated to high temperature, their surfaces get wet, thereby producing a molten substance. The molten substance fills up the gaps between wet members 88 and metal members 42 and 43. Thus, the sealing performance can be further improved.

The wet members have a relatively great coefficient of expansion, so that insulating member 44 is thermally expanded to a higher degree than separator element 5. Accordingly, the contact pressure between insulating member 44 and metal members 42 and 43 increases, so that the sealing function is improved.

In this modification, moreover, the insulating member is formed of the ceramic member and the wet members. Alternatively, however, the insulating member may be formed only of a member which has electrical insulating capability and is adapted to have its surface moistened at high temperature.

In order to maintain the sealing performance, furthermore, a material similar to the material of the electrolyte tile is used for the wet members. Alternatively, however, the wet members may be made of a material which can easily soften at the working temperature of the fuel cell. For example, the wet members may be formed of a thin ceramic sheet which can easily extend and contract during the operation of the fuel cell. Alternatively, the wet members may be formed of a thin silver sheet, et al. which has high ductility and malleability, and can easily soften to be deformed at the working temperature of the fuel cell.

Figure 22:
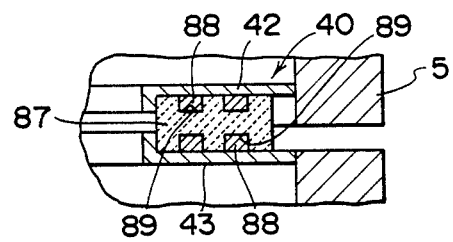

FIG. 22 shows an eighteenth modification of the present invention. This modification differs from the one shown in FIG. 21 only in the following arrangement. In this modification, two annular grooves 89 are formed on each side of ceramic member 87. Ring-shaped wet members 88 are fitted in grooves 89, thus constituting insulating member 44. Also in this modification, wet members 88 are formed of, for example, an electrolyte. When they are heated to high temperature, their surfaces get wet, thereby producing a molten substance. The molten substance fills up the gaps between wet members 88 and metal members 42 and 43. Thus, the sealing performance can be further improved.

Since the molten substance is received by grooves 89, it can be prevented from leaking out. If the two ring-shaped wet members are formed of different materials which get wet at temperatures of different ranges, the temperature range to be sealed can be widened. Although two annular grooves are formed on each side of the insulating member, one or three or more grooves may be formed on each side with the same result. Further, these grooves may alternatively be formed on ring-shaped metal members.

Figure 23:
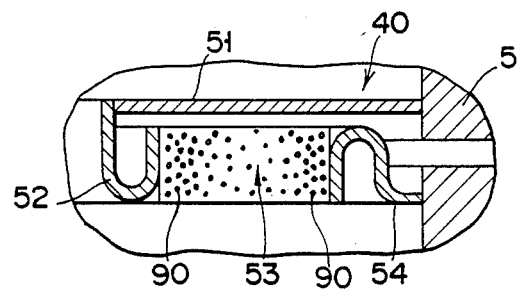

FIG. 23 shows a nineteenth modification of the present invention. This modification differs from the one shown in FIG. 5 only in the following arrangement. In this modification, dispersoids 90 of a metal with a coefficient of linear expansion greater than that of insulating member 53 are dispersed in the insulating member. In this case, the insulating member is formed by sintering or the like, with the dispersoids intermixed. The nearer to metal members 52 and 54 a portion of insulating member 53 is located at, the more densely dispersoids 90 are distributed at the portion, and the nearer to the center of insulating member 53 a portion thereof is located at, the more roughly dispersoids 90 are distributed at the portion.

Accordingly, the coefficient of expansion of those portions of insulating member 53 which are located relatively close to metal members 52 and 54 is made substantially equal to that of the metal members. If metal members 52 and 54 and insulating member 53 undergo thermal expansion, therefore, those portions of the insulating member situated relatively close to the metal members can be thermally expanded to substantially the same degree as the metal members. Thus, unreasonable thermal stress cannot be applied to the junctions between the metal members and the insulating member. In consequence, the insulating member can maintain its insulating capability. Unlike an insulating member of a single phase, moreover, the insulating member of this modification is free from separation of the junctions, so that the sealing performance is improved. In the processes of the manufacture, furthermore, the effectiveness of the ceramic bonding between the insulating member and the metal members is improved. In the whole region or part of insulating member 53, dispersoids 90 are distributed lest they be in contact with one another. In this manner, the electrical insulation between metal members 52 and 54 is maintained.

Figure 24:
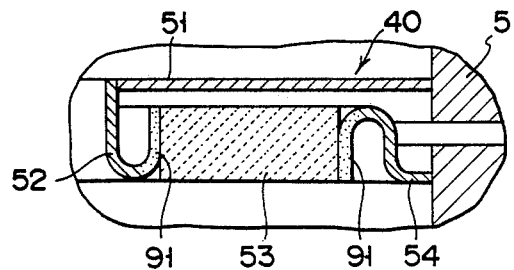

FIG. 24 shows a twentieth modification of the present invention. This modification differs from the one shown in FIG. 23 only in the following arrangement. Although the same insulating member of FIG. 5 is used, in this modification, dispersoids 91 with a coefficient of linear expansion smaller than that of metal members 52 and 54 are dispersed in those portions of the metal members which are in contact with the insulating member.

Thus, also in this modification, the coefficient of linear expansion of those portions of metal members 52 and 54 in contact with the insulating member is substantially equal to that of the insulating member. If metal members 52 and 54 and insulating member 53 undergo thermal expansion, therefore, those portions of the metal members in contact with the insulating member can be thermally expanded to substantially the same degree as the insulating member. Thus, unreasonable thermal stress cannot be applied to the junctions between the metal members and the insulating member. Unlike an insulating member of a single phase, therefore, the insulating member of this modification is free from separation of the junctions, so that the sealing performance is improved.

Figure 25:
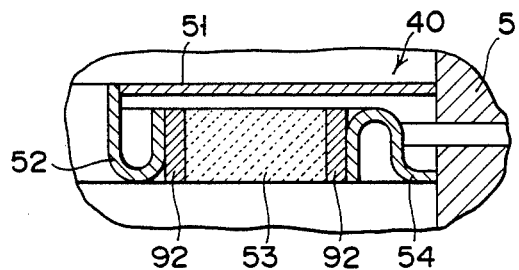

FIG. 25 shows a twenty-first modification of the present invention. This modification differs from the one shown in FIG. 23 only in the following arrangement. In this modification, composite material layer 92 is interposed between insulating member 53 and each of metal members 52 and 54. Layers 92 and insulating member 53 may be bonded by compounding and sintering a powder layer of an insulating material and a composite powder layer of an insulator and a metal mixed separately.

Accordingly, the coefficient of expansion of composite material layers 92 is intermediate between those of the metal members and the insulating member. If the metal members and the insulating member undergo thermal expansion, therefore, unreasonable thermal stress cannot be applied to the junctions between the metal members and the composite material layers and between the composite material layers and the insulating member. Thus, the junctions cannot be separated, so that the sealing performance is improved.

The metal used for the composite material layers may be selected from metals which can easily diffuse with the metal material for the metal members 52 and 54. The joining strength can be increased by mixing a separate binder material with the metal. Further, composite material layers 92 may be formed having a multistage structure. More specifically, the coefficient of expansion of layers 92 may be gradually increased from the side of insulating member 53 toward metal members 52 and 54. Thus, thermal stress acting on the junctions can be further reduced.

Although the separator elements and the metal members are bonded by welding, fitting, etc., in the embodiments described above, they may be joined by any other suitable methods. The join surfaces of the ring-shaped metal members and the insulating member may be roughened to increase the join area.

The ring-shaped metal members shown in FIGS. 16 to 21, like the ones shown in FIGS. 5 to 15 and 23 to 25, may enjoy a flexible structure. The other arrangements of the individual modifications may be suitably combined with one another.

Although a molten carbonate fuel cell has been described in connection with the above embodiments, the present invention may be also applied to a phosphoric acid fuel cell.

What is claimed is:

1. A fuel cell comprising:
  a plurality of unit cells stacked in layers, each adapted to receive two kinds of gases to generate electrical power;
  a plurality of separator elements, each formed of a conductive material and having a peripheral region and a first segment channel penetrating the peripheral region thereof, said separator elements being interposed and electrically connected between the adjacent unit cells to form a stacked structure in which the first segment channels are aligned in the stacking direction; and
  a plurality of seal members,
  each said seal member including
    (a) two annular conductive members,
    (b) an electrically insulating annular member interposed between the two conductive members, and
    (c) a second segment channel penetrating the two conductive members and the insulating member, said two annular conductive members being joined to the adjacent separator elements so as to communicate the second segment channel with the adjacent first segment channels to define a manifold for the intake and exhaust of the gas into and from the unit cells, thereby preventing the gas in the manifold from leaking out, and insulating the adjacent separator elements.

2. The fuel cell according to claim 1, wherein each said seal member has flexibility with respect to the stacking direction.

3. The fuel cell according to claim 1, wherein each said seal member includes means for absorbing a force acting on the seal member in the stacking direction.

4. The fuel cell according to claim 3, wherein said absorbing means includes means for bending the conducive member in the stacking direction when the force acts on the seal member in the stacking direction.

5. The fuel cell according to claim 4, wherein said means for bending the conductive members includes a member having an inner peripheral end bonded to one of the conductive members and an outer peripheral end bonded to the separator element and extending in a plane direction along the separator element.

6. The fuel cell according to claim 1, wherein each said seal member has flexibility with respect to a plane direction along the separator element.

7. The fuel cell according to claim 1, wherein each said seal member includes means for absorbing a force acting on the seal member in a plane direction along the separator element.

8. The fuel cell according to claim 7, wherein said absorbing means includes means for bending a conductive member in the plane direction when the force acts on the seal member in the plane direction.

9. The fuel cell according to claim 8, wherein said means for bending the conductive members includes at least one portion with a bent cross section formed on the conductive members.

10. The fuel cell according to claim 9, wherein the portion with a bent cross section has a substantially U-shaped cross section.

11. The fuel cell according to claim 9, wherein the portion with a bent cross section has a substantially L-shaped cross section.

12. The fuel cell according to claim 8, wherein said means for bending the conductive members includes a waist portion formed on the conductive members.

13. The fuel cell according to claim 1, wherein said conductive members and said insulating member are hermetically joined together.

14. The fuel cell according to claim 13, wherein said conductive members and said insulating member are joined together by brazing.

15. The fuel cell according to claim 13, wherein said conductive members and said insulating member are joined together by ceramic bonding.

16. The fuel cell according to claim 13, wherein said conductive members and said insulating member are joined together by welding.

17. The fuel cell according to claim 1, wherein one of said conductive member and said insulating member has a slit, and the other has a projection, so that the projection is fitted in the slit.

18. The fuel cell according to claim 13, wherein said insulating member has flat surfaces extending in a plane direction, said conductive members being joined individually to the flat surfaces.

19. The fuel cell according to claim 13, wherein said insulating member has peripheral surfaces extending in the stacking direction, said conductive members being bonded individually to the peripheral surfaces.

20. The fuel cell according to claim 13, wherein each said conductive member has a thick-walled peripheral end portion joined to the insulating member.

21. The fuel cell according to claim 13, further comprising a second annular conductive member which is interposed between each said conductive member and said insulating member.

22. The fuel cell according to claim 13, wherein said insulating member has step portions to which the conductive members are joined, whereby the conductive members are positioned to the insulating member.

23. The fuel cell according to claim 13, wherein each said conductive member has a portion with a curved cross section and a portion with a straight cross section connected to the curved portion and joined to the insulating member.

24. The fuel cell according to claim 1, wherein the inner peripheral end of each said conductive member is contact to that of the insulating member by crimping.

25. The fuel cell according to claim 1, wherein the inner peripheral end of each said conductive member is contact to that of the insulating member by press fitting.

26. The fuel cell according to claim 24 or 25, wherein the inner peripheral end of said insulating member has a concave cross section.

27. The fuel cell according to claim 24 or 25, wherein the inner peripheral end of each said conductive member has a plurality of slits.

28. The fuel cell according to claim 24 or 25, wherein a gap is defined between the inner peripheral end of the conductive member and that of the insulating member so that the inner peripheral end of the conductive member slides along that of the insulating member at a predetermined temperature whereby the gap allows frictional resistance of the slide to decrease.

29. The fuel cell according to claim 1, wherein said insulating member includes two wet members, joined individually to the two conductive members and adapted to get wet at a predetermined temperature, and a ceramic member interposed between the wet members.

30. The fuel cell according to claim 29, wherein said ceramic member has recesses in which the wet members are fitted.

31. The fuel cell according to claim 1, wherein the insulating member has dispersoids of a metal with a coefficient of expansion greater than that of said insulating member and dispersed in the insulating member, the nearer to the conductive member a portion of the insulating member is located at, the more densely dispersoids are distributed at the portion, and the nearer to the center of the insulating member a portion thereof is located at, the more roughly dispersoids are distributed at the portion.

32. The fuel cell according to claim 1, wherein the insulating member has dispersoids with a coefficient of expansion smaller than that of said conductive members and dispersed in those portions of the conductive members which are in contact with the insulating member.

33. The fuel cell according to claim 1, wherein the insulating member has a composite material layer which is interposed between each said conductive member and said insulating member, said composite material layer being formed of an insulating material and a metal.

34. The fuel cell according to claim 33, wherein said composite material layer is a multistage layer.

35. The fuel cell according to claim 1, wherein one of said conductive members is located on one side of the insulating member with respect to the stacking direction, and the other conductive member is located on the other side.

36. The fuel cell according to claim 1, wherein one of said conductive members is located inside the insulating member with respect to the radial direction of the manifold, and the other conductive member is located outside.

37. The fuel cell according to claim 1, wherein each said separator element includes at least two flat plates defining the first segment channel 38. The fuel cell according to claim 37, wherein one flat plate is joined to the conductive member of said seal member, and the other flat plate is joined to the conductive member of said adjacent seal member.

39. The fuel cell according to claim 37, wherein each the flat plate has a raiser flange formed at the internal peripheral end thereof and joined to the conductive member.

40. The fuel cell according to claim 9, wherein the conductive member has a raiser flange joined to said separator.

41. The fuel cell according to claim 1, wherein the outer peripheral end portion of each said conductive member is joined to the inner peripheral surface of the first segment channel of each corresponding separator element.

42. The fuel cell according to claim 1, wherein a gap communicating the manifold with the unit cell is formed between the seal member and the adjacent seal member.

43. The fuel cell according to claim 27, wherein each slit of said one conductive member is relatively engaged with slit of said another conductive member.

44. A fuel cell comprising:
   a plurality of unit cells stacked in layers, each adapted to receive two kinds of gases to generate electrical power;
   a plurality of separator elements, each formed of a conductive material and having a peripheral region and a first segment channel penetrating the peripheral region thereof, said separator elements being interposed and electrically connected between the adjacent unit cells to form a stacked structure in which the first segment channels are aligned in the stacking direction; and
   a plurality of seal members,
   each said seal member including
   (a) two annular ends,
   (b) a second segment channel penetrating the annular ends, at least one of said annular ends being joined to the inner surface of the first segment channel of one of the separator elements and the other annular end being joined to any place of the adjacent separator element so as to communicate the second segment channel with the adjacent first segment channels to define a manifold for the intake and exhaust of the gas into and from the unit cells, thereby preventing the gas in the manifold from leaking out, and
   (c) means for electrically insulating the two annular ends from each other, thereby insulating the adjacent separator elements.

45. A seal member for a manifold of a fuel cell, which has a plurality of unit cells stacked in layers, each adapted to receive two kinds of gases to generate electrical power, and a plurality of separator elements, each formed of a conductive material and having a peripheral region and a first segment channel penetrating the peripheral region thereof, said separator elements being interposed and electrically connected between the adjacent unit cells to form a stacked structure in which the first segment channels are aligned in the stacking direction,
   said seal member comprising:
      two annular conductive members;
      an electrically insulating annular member interposed between the two conductive members; and
      a second segment channel penetrating the two conductive members and the insulating member, said two annular conductive members being joined to the adjacent separator elements so as to communicate the second segment channel with the adjacent first segment channels to define a manifold for the intake and exhaust of the gas into and from the unit cells, thereby preventing the in the manifold from leaking out, and insulating the separator elements.

* * * * *

UNITED STATES PATENT AND TRADEMARK OFFICE
CERTIFICATE OF CORRECTION

PATENT NO. : 4,942,099

DATED : JULY 17, 1990

INVENTOR(S) : KENJI ISOBE ET AL.

It is certified that error appears in the above-identified patent and that said Letters Patent is hereby corrected as shown below:

Title page:

In the 3rd row under Foreign Application Priority Data, delete "1-19824" and insert --1-198424--.

Signed and Sealed this

Third Day of September, 1991

Attest:

HARRY F. MANBECK, JR.

Attesting Officer

Commissioner of Patents and Trademarks